(12) United States Patent
Newton

(10) Patent No.: US 8,336,249 B2
(45) Date of Patent: Dec. 25, 2012

(54) FISHING CASTING DEVICE

(76) Inventor: Michael W. Newton, Cape Woolamai (AU)

(*) Notice: Subject to any disclaimer, the term of this patent is extended or adjusted under 35 U.S.C. 154(b) by 366 days.

(21) Appl. No.: 12/310,171

(22) PCT Filed: Aug. 14, 2007

(86) PCT No.: PCT/AU2007/001150
§ 371 (c)(1),
(2), (4) Date: Apr. 27, 2009

(87) PCT Pub. No.: WO2008/019435
PCT Pub. Date: Feb. 21, 2008

(65) Prior Publication Data
US 2009/0241408 A1 Oct. 1, 2009

(30) Foreign Application Priority Data

Aug. 15, 2006 (AU) ................................ 2006904524

(51) Int. Cl.
*A01K 91/02* (2006.01)
(52) U.S. Cl. ................................................. 43/19; 43/25
(58) Field of Classification Search ................ 43/19, 25; A01K 91/02
See application file for complete search history.

(56) References Cited

U.S. PATENT DOCUMENTS

| | | | |
|---|---|---|---|
| 3,053,004 A * | 9/1962 | Baker | 43/25 |
| 3,069,800 A * | 12/1962 | Ransom | 43/25 |
| 3,499,242 A * | 3/1970 | Tucker, Sr | 43/25 |
| 4,439,944 A * | 4/1984 | Johnson | 43/19 |
| 4,566,217 A * | 1/1986 | Geary, Sr. | 43/19 |
| 5,060,412 A * | 10/1991 | Ries | 43/19 |
| 5,430,968 A * | 7/1995 | Watkins et al. | 43/25 |
| 5,890,379 A * | 4/1999 | Robinson | 43/25 |
| 7,698,851 B1 * | 4/2010 | Donohoe | 43/19 |

FOREIGN PATENT DOCUMENTS

| | | |
|---|---|---|
| AU | 48368/97 | 2/1999 |
| SU | 635941 | 12/1978 |
| SU | 1644862 A | 4/1991 |

* cited by examiner

*Primary Examiner* — Kimberly Berona
*Assistant Examiner* — Kathleen Iwasaki
(74) *Attorney, Agent, or Firm* — Ryan Kromholz & Manion, S.C.

(57) ABSTRACT

A fishing casting device (10) for mounting onto a fishing rod (12), the casting device comprising a mount (20) and a catch (30) connected to the mount (20), wherein the fishing line (15) is releasably held by the catch (30). The device (10) also includes a release mechanism (40) adapted to release the fishing line (15) from the catch (30) during a casting action when a predetermined casting force is reached.

6 Claims, 5 Drawing Sheets

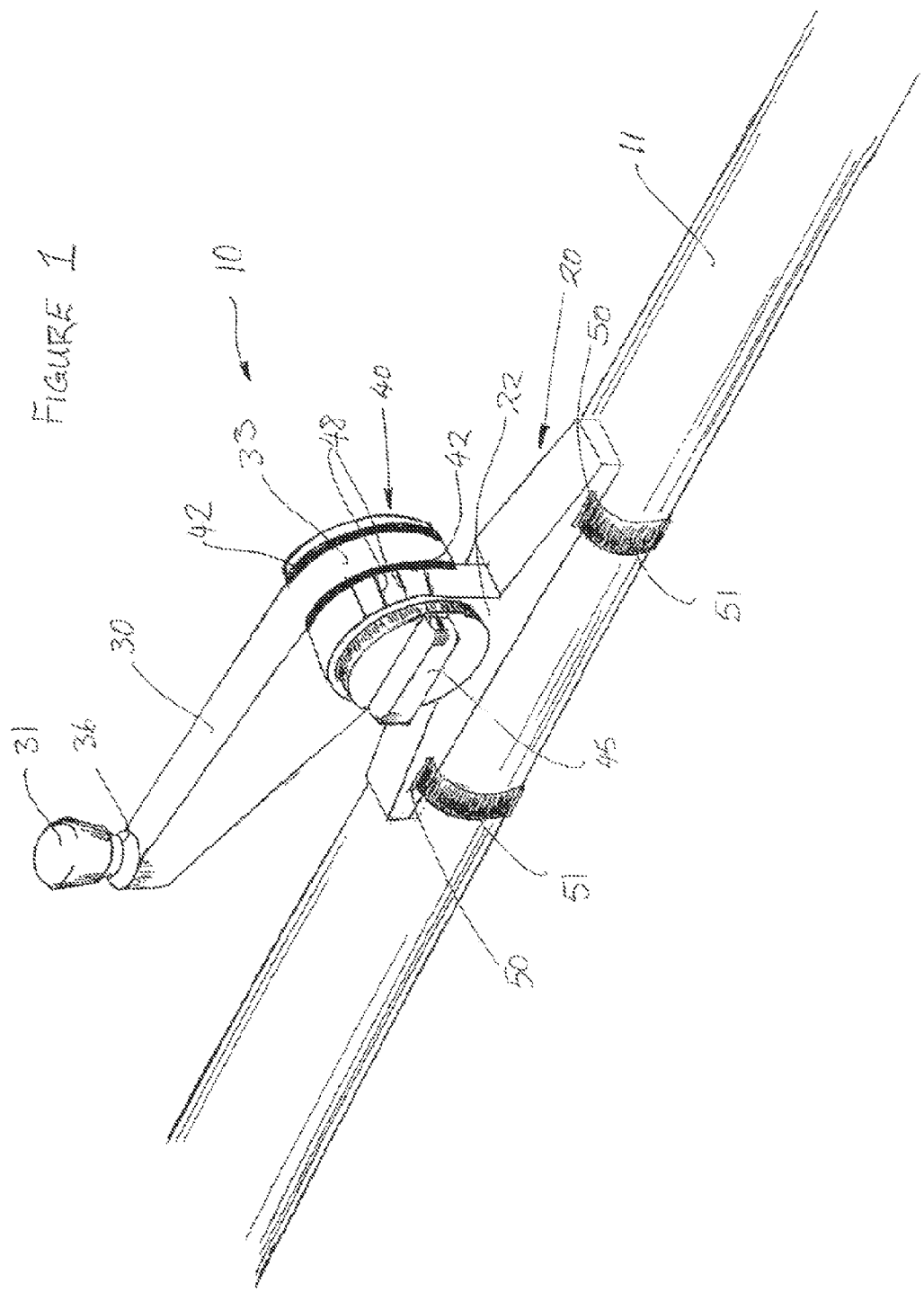

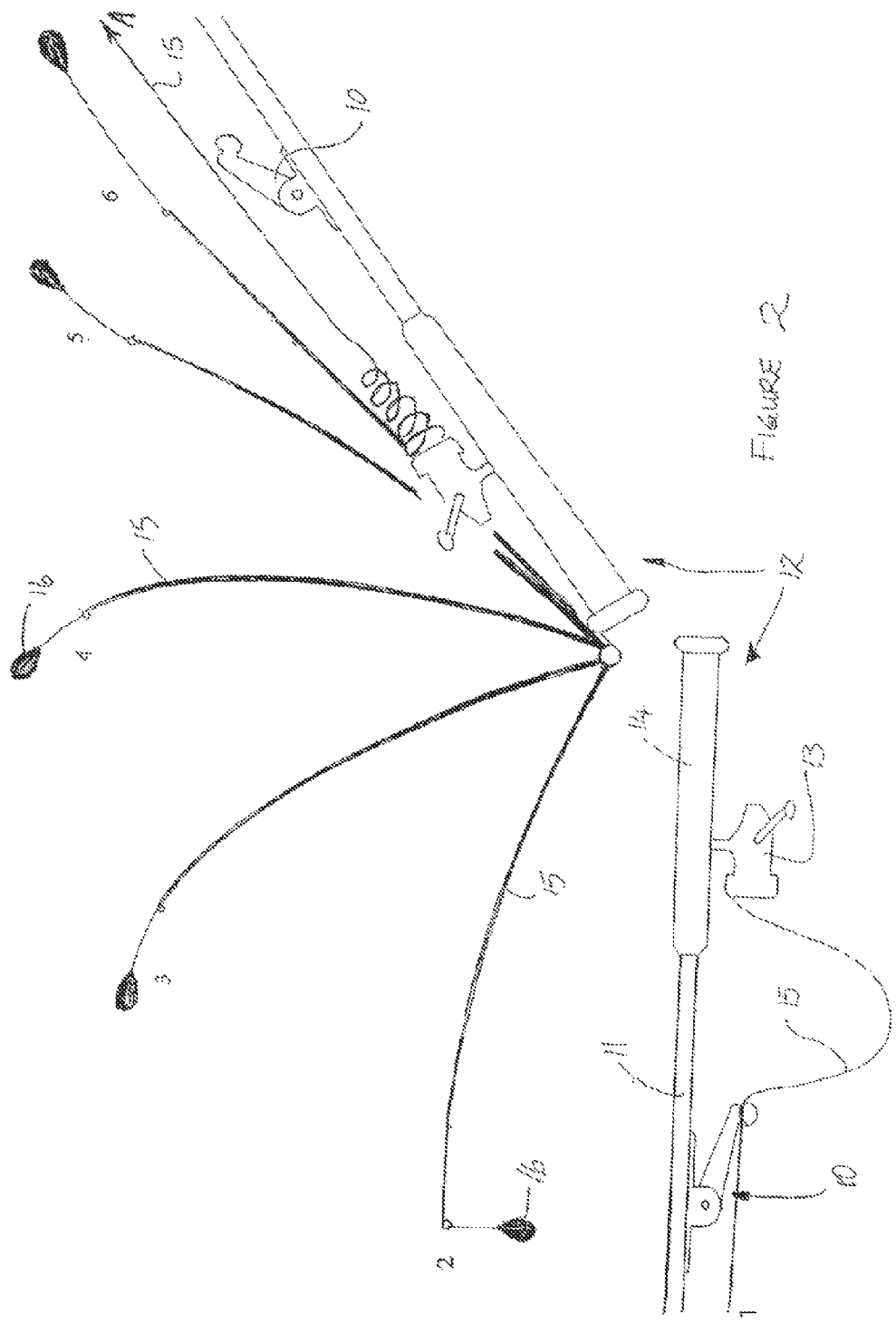

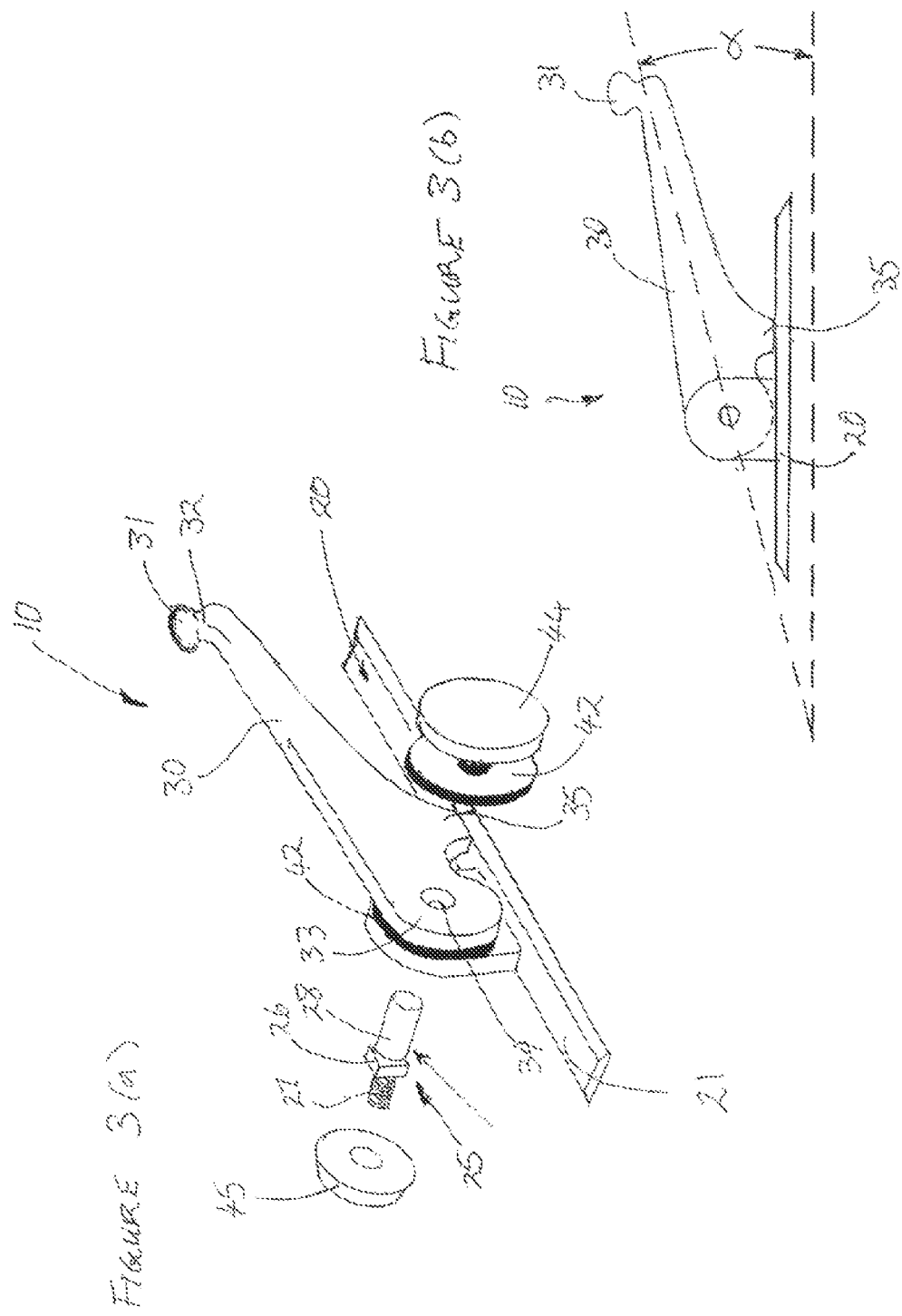

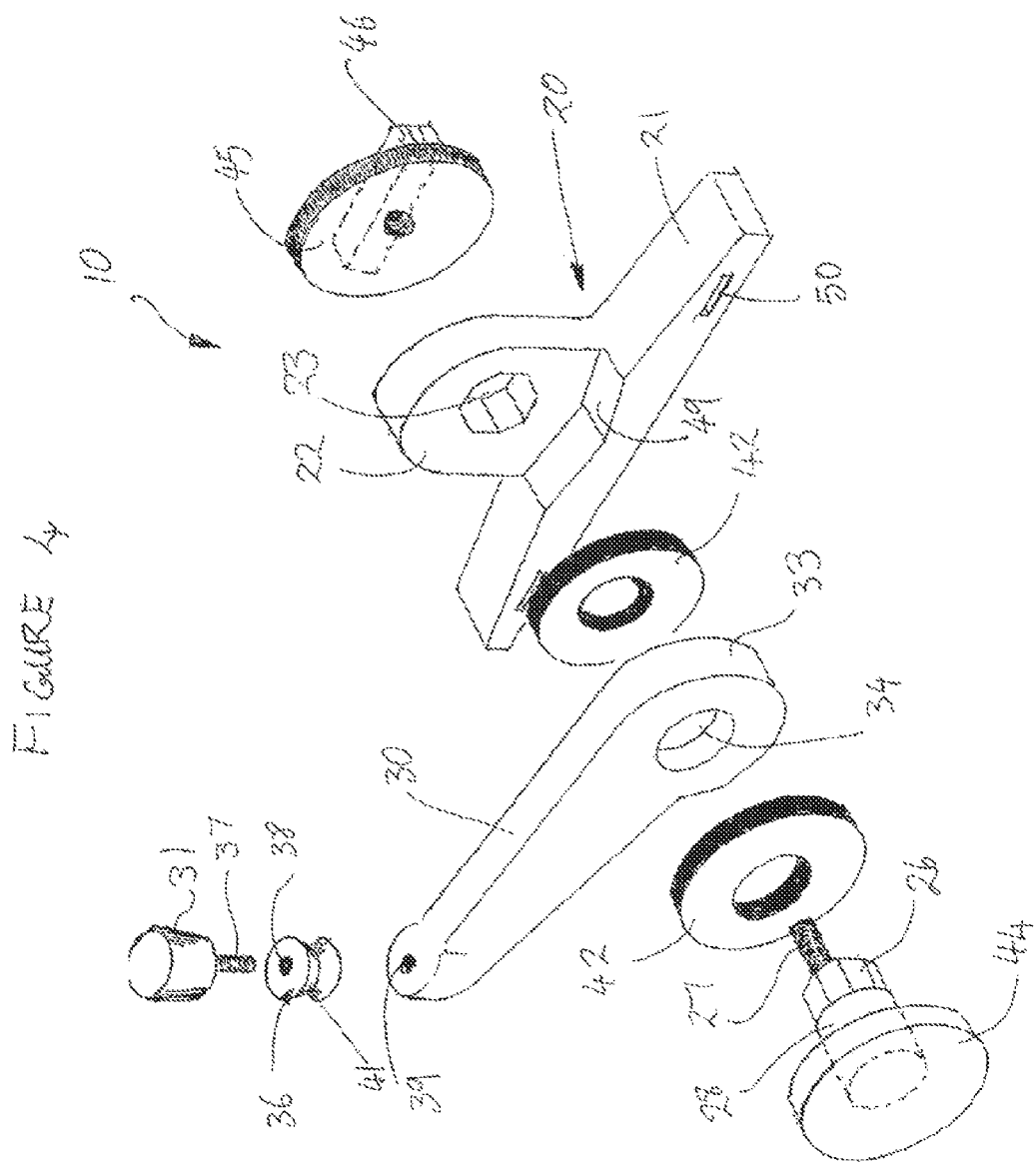

FISHING CASTING DEVICE

The present invention relates to a casting device used in fishing to improve the casting direction and casting distance of a weighted fishing line.

BACKGROUND OF INVENTION

Casting a fishing line using a fishing rod requires a user to open the bail arm on the fishing reel at the handle end of the rod and restraining the fishing line usually by holding the line against the rod using a thumb or finger while the fishing rod is swung from a position behind the user through an arc of approximately 180° where the fishing line is then released by releasing the thumb or finger and allowed to propel a distance away from the user under the weight of a sinker or weighted lure.

Skill, coordination and experience teaches the fisherman the optimum point to release the weighted line in the casting arc and to propel the hook and weight at the end of the fishing line, which occurs when the fishing line is at the point of maximum load in the arc and at the optimum casting angle. Releasing the fishing line too early or too late will result in a cast having insufficient momentum to reach the desired destination or a cast that will enter the water too soon.

By practising casting techniques a user will become familiar with the optimum point at which to release the fishing line having regard to the user's casting strength and style and the weight of the sinker/lure. In the meantime casting fishing lines is often met with frustration and inaccurate casting.

The present casting device is intended to facilitate casting of fishing rods such that all users, experienced or inexperienced, may achieve a smooth and accurate cast.

SUMMARY OF INVENTION

In accordance with the present invention there is provided a fishing casting device for mounting onto a fishing rod, the casting device comprising: a mount and a catch connected to the mount, wherein the fishing line is releasably held by the catch; and a release mechanism adapted to release the fishing line from the catch during a casting action when a predetermined casting force is reached.

The catch is typically a lever arm pivotally connected to the mount, wherein the fishing line is releasably held on the arm and the release mechanism allows the arm to pivot relative to the mount under the predetermined casting force.

In accordance with the present invention there is further provided a fishing casting device for mounting onto a fishing rod, the casting device comprising: a mount and a lever arm pivotally connected to the mount, wherein the fishing line is releasably held on the arm; and a release mechanism adapted to allow the arm to pivot relative to the mount under a predetermined casting force thereby releasing the fishing line from the arm.

The arm is preferably connected to the mount by a pivot pin. The release mechanism operates by applying tension to the pivot connection between the lever and mount and, more specifically, by tensioning the lever arm at the pivot pin between resilient washers thereby increasing the resistance to pivot. The washers are preferably rubber, silicon or Teflon® washers that are coaxially aligned on the pivot pin on either side of the arm. A back plate holds the washer and arm assembly on the pivot pin against the mount.

Preferably, the predetermined casting force is adjustable to adjust with the personal style and strength of the user and the weight of the sinker/lure. The tension on the pin is variable to adjust the point of release by way of an adjusting dial threadably connected onto the pin so as to move the pin, and the release mechanism on the pin, closer to or further from the mount thereby respectively tightening or loosening the tension.

The adjusting dial is preferably provided with a marking such as a pointer which corresponds to indicia provided on the mount whereby the indicia correlates to dial settings for selected predetermined tension settings.

The arm preferably has a head at which the fishing line is releasably held wherein the head is bulbous and is located on the lever arm by a neck around which the fishing line is wound. The neck may be moulded integrally with the lever arm or may alternatively be replaced by a separate waisted guide, preferably made of metal, to facilitate release of the fishing line.

The arm includes a stop that bears against a land on the mount to provide a consistent reference point defining a standby position from which the lever arm is pivoted to a release position.

The mount may include slots through which ties may be threaded for tying the casting device onto a fishing rod.

In accordance with the present invention there is still further provided a fishing rod having a reel near a handle of the rod and a casting device mounted to the rod spaced from the reel towards the end of the rod opposite the handle, the casting device comprising: a mount and a lever arm pivotally connect to the mount, wherein the fishing line is releasably held onto an end of the arm; and a release mechanism adapted to allow the arm to pivot relative to the mount under a predetermined casting force thereby releasing the fishing line from the arm.

The casting device is preferably mounted between the reel and the first runner through which the fishing line threads. The casting device may be removably mounted on the fishing rod by sliding a portion of the mount into a corresponding recess or protrusion on the rod.

In accordance with the present invention there is still further provided a method of casting a fishing line with a fishing rod having a casting device mounted onto the fishing rod, the casting device having a mount and lever arm pivotally connected to the mount, wherein the fishing line is releasably held onto an end of the arm; and a release mechanism adapted to allow the arm to pivot relative to the mount under a predetermined casting force thereby releasing the fishing line from the head, the method including:

releasably holding a loaded fishing line around the lever arm of the casting device;
  setting the casting device into a standby position; and
  casting the fishing rod whereby the fishing line is released from the casting device when the predetermined casting force is reached thereby propelling the fishing line forward.

BRIEF DESCRIPTION OF THE DRAWINGS

The embodiments, incorporating all aspects of the invention, will now be described by way of example only with reference to the accompanying drawings in which:

FIG. 1 is an isometric view of a fishing casting device in accordance with a first embodiment of the present invention;

FIG. 2 illustrates the motion in a series of stages of casting a fishing rod using the casting device;

FIG. 3(a) is an exploded isometric view of a second embodiment of the casting device;

FIG. 3(b) is a side view of the device of FIG. 3(a);

FIG. 4 is an exploded isometric view of the first embodiment of the casting device;

FIG. 5(b) is a side view of the pivot pin of FIG. 5a; and

FIG. 5(c) is an end view of the pivot pin of FIG. 5a.

DETAILED DESCRIPTION OF PREFERRED EMBODIMENTS

Figure 5A:
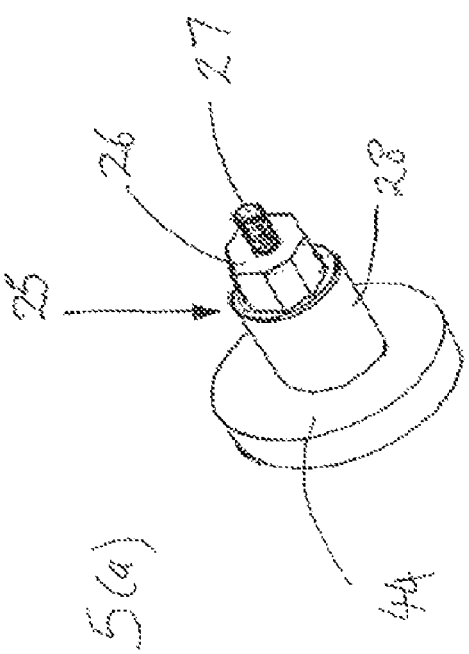
FIG. 5(a) is an isometric view of a pivot pin of the first embodiment of the casting device.

Two embodiment of a fishing casting device 10 is illustrated in the drawings. FIGS. 1, 4, 5(a)-5(c) illustrate a first embodiment while FIGS. 3(a) and 3(b) illustrate a second embodiment. FIG. 2 generally illustrates casting device 10 mounted on a fishing rod 12.

The fishing casting device 10 is adapted to be mounted onto the shaft 11 of fishing rod 12 and, as illustrated in FIG. 2, spaced away from the reel 13 which is located on or near the handle 14 of the fishing rod 12.

Casting device 10 is designed to release the weighted fishing line 15 from the rod at the maximum casting force when the fishing rod follows through a casting swing in order to propel the weighted fishing line a far distance over the water. The device 10 is designed to release the fishing line from the rod at the optimum point in the cast thereby replacing the need for the user to manually restrain the line and choose at what point to release the line. The casting device 10 achieves this function by having a catch that holds onto the line until a casting force, resulting from the angular momentum of the weighted fishing line following an arcuate swing path, reaches a maximum and predetermined value. At this point the fishing line is released and allowed to be propelled forward.

The catch on the casting device that releasably holds the fishing line until a predetermined casting force is reached may be in various forms such as a spring loaded snap release mechanism, clamping arms or the like. In the preferred embodiments discussed below the catch is a pivoting lever arm 30 having a head 31 to which the fishing line 15 is releasably held.

In its basic form illustrated in the drawings the casting device 10 includes a mount 20 that includes a flat land 21 wherein the mount 20 is adapted to be secured to the shaft 11 of a fishing rod 12. Pivotally connected to the mount 20 is the lever arm 30. The fishing line 15 is adapted to be releasably held by lever arm 30 and more specifically by a head 31 provided at the end of lever arm 30 and connected to lever arm by a waisted guide 36 in the first embodiment, or by a neck 32 in the second embodiment, which forms an extension of lever arm 30.

As illustrated in the exploded view of FIG. 4 waisted guide 36 and head 31 are separate components to lever arm 30 and are assembled at the end of lever arm 30. Head 31 in this embodiment includes a threaded shaft 37 that extends through a central bore 38 in guide 36 and through to a threaded aperture 39 provided at the end of lever arm 30. FIG. 1 illustrates the assembled state of the head/guide/lever arm arrangement. Guide 36 is preferably made of metal to encourage smooth release and smooth guidance of the fishing line around the guide. The guide has a circumferential waist 41 that acts as a groove into which the fishing line is settles.

Mount 20 includes an upstanding flange 22 from flat land 21 wherein upstanding flange 22 has an aperture 23 to receive a pivot pin 25. Pivot pin 25 is coupled to lever arm 30 to allow for a pivoting relationship between arm 30 and mount 20. Specifically, pivot pin 25 extends through an aperture 34 in a shoulder 33 of lever arm 30 located at the opposite end of lever arm to the head 31. This pivoting arrangement allows the lever arm to pivot about pivot pin 25 and relative to mount 20.

A weighted fishing line 15 ready to be cast is releasably held by arm 30 by winding the line 15 several times around neck 32 or guide 36 whereby the line will be prevented from escaping off arm 30 by head 31.

A release mechanism 40 determines the point at which the fishing line is released from the arm which occurs at the point when a predetermined casting force is reached. Release occurs by the pivoting motion of arm 30 to free the fishing line and allow it to propel forward of the rod.

FIG. 2 illustrates a series of six steps in the casting motion of a fishing rod through to the release of the line 15. The steps are sequentially numbered from the start of the swing to the end of the swing by numbers 1 to 6 respectively.

At stage 1 lever arm 30 of casting device 10 is pivoted back towards the handle 14 of fishing rod 12 to a "standby" position. A weighted fishing line 15 is wound around the head 31 at guide 36 or neck 32 approximately 3 or 4 times to hold the fishing line in place during the swing and to prevent premature release. The pivoting motion of the arm 30 relative to mount 20 is required in order to release line 15 by reorientating the head 31 with respect to the direction of pull, or casting force, of the fishing line at the point of release. In other words in the standby position the head is oriented to prevent line release but in the release position the head orientates to allow line release.

In the orientation shown in stage 1 the fishing line 15 is held by head 31 and prevented from unwinding. The fishing rod is then cast through an arc in order to cast the fishing line. Stages 2, 3, 4 and 5 illustrate the fishing line and a weight 16 at various points of travel through the arc. From stage 1 through to stages 3 to 4 the fishing line and casting weight increases in angular momentum. The casting force therefore also increases as the rod nears the release position illustrated at stage 6, at which point the casting force reaches a maximum value that overcomes a resistance or tension that holds the lever arm in the standby position and consequently causes the lever arm to pivot to the release position illustrated in stage 6.

At stage 6 head 31 is oriented to allow the weighted line 15 to release by unwinding from the head 31 without obstruction and under an outward casting force on the line in the direction of arrow A illustrated at stage 6. Because the bail arm of the reel is open the weighted line travels forward and spins free of the spool in the reel to complete the cast.

By applying tension between the lever arm 30 and mount 20, the release mechanism 40 holds the fishing line back from release until the optimum release point is reached. The release mechanism 40 achieves this by preventing arm 30 from pivoting from the standby position illustrated at stage 1 of FIG. 2 until the appropriate pulling force, or casting force, on the fishing line is reached, which force overcomes the resisting force of the tension on the release mechanism. Upon reaching the release point of the predetermined casting force the release mechanism allows arm 30 to pivot into the release position under the angular momentum of the forward action of the swinging fishing rod 12.

Release mechanism 40 is adjustable so as to adjust the release point to accord with the skill, strength and experience of the user, the casting weight used and characteristics of the fishing rod, such as rod flexibility. In practice the casting force at the optimum release point will vary depending on: the strength of the user; the technique of the user; as well as the weight at the end of the fishing line.

Release mechanism 40 comprises a tension arrangement whereby the tension between the pivoting connections of the lever arm 30 and mount 20 is increased or decreased. The tension governed by release mechanism 40 is directly proportional to the predetermined casting force. Components of release mechanism 40 include two resilient washers 42 mounted coaxially on pivot pin 25 with one washer to each side of shoulder 33 of lever arm 30. Accordingly, and as illustrated in opposite directions in FIGS. 3(a) and 4, one resilient washer 42 locates between shoulder 33 and upstanding flange 22 of mount 20 while another washer 42 locates on the other side of shoulder 33 and is held thereagainst by a back plate 44 that is fixed to a corresponding end of pivot pin 25.

FIG. 3(a) illustrates back plate 44 detached from pivot pin 25 whereby after assembly pivot pin 25 and back plate 44 can be fixed temporarily by threaded engagement. Alternatively, FIGS. 4, and 5(a) to 5(c) illustrate an embodiment where the pivot pin 25 and back plate 44 are cast in one piece.

As illustrated in FIG. 4, mount aperture 23 in upstanding flange 22 is an octagonal aperture that receives a correspondingly octagonal key 26 on pivot pin 25. FIG. 3(a) shows the second embodiment having a square key/aperture combination. In this embodiment pivot pin 25 which includes key 26 further includes a threaded shank 27 extending to one side of the key 26. The other side of key 26 is a smooth shaft 28 receivable in aperture 34 of lever arm 30.

Figure 5B:
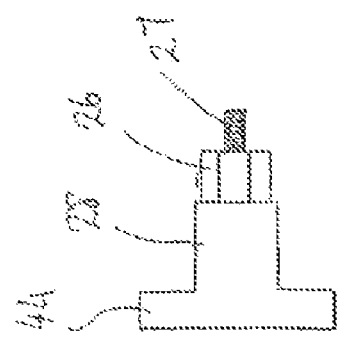
Figure 5C:
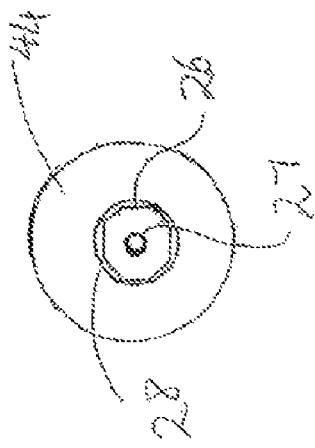

As best illustrated in FIGS. 5(a) and 5(b), octagonal key 26 and mount aperture 23 are slightly smaller in size than the diameter of smooth shaft 28 to prevent smooth shaft 28 from sliding into mount aperture 23. Washers 42 and shoulder 33 of lever arm 30 are all mounted on smooth shaft 28 while threaded shank 27, which is smaller in diameter than mount aperture 23, extends through mount aperture 23 to the other side of upstanding flange 22 to engage an adjusting dial 45 that is mounted on the side of upstanding flange 22 opposite to lever arm 30.

By way of key 26, pivot pin 25 remains axially fixed relative to upstanding flange 22. Therefore, when a user rotates adjusting dial 45 on threaded shank 27 the whole pivot pin 25 is shifted axially thereby moving back plate 44 closer or further from upstanding flange 22 to tighten or loosen the pivoting fit, or tension, between lever arm 30 and mount 20 caused by the pressure by the resilient washers 42. The more pressure that is applied between the pivoting components on pivot pin 25 is required on lever arm 30 to pivot arm 30 relative to mount 20.

Accordingly, the tension on the release mechanism 40 can be adjusted by rotating adjusting dial 45 as necessary to allow lever arm 30 to rotate only when the casting force increases and reaches a predetermined casting force set by the tension on release mechanism 40. At the point the predetermined casting force is reached lever arm 30 pivots from the standby position to the release position to allow the weighted fishing line 15 to unravel.

If adjustment of dial 45 is not sufficient to increase or decrease the tension to a desired force, key 26 may be manually readjusted by rotating in octagonal or square aperture 23 for a greater degree of tension adjustment. Fine adjustment can then be carried out with adjusting dial 45.

Adjusting dial 45 may be provided with a pointer 46 which corresponds to indicia 48 provided on the same side of flange 22 to provide markings against which different levels of tension may be identified and reliably used to select desired tension levels/release points.

The tension on the release mechanism may be adjusted according to the user and weight of the sinker. For example, a young teenager casting a 2 oz. sinker will have a lower swinging force on the rod and cast the fishing line a shorter distance than a strong adult using an aggressive casting action to cast a line with a 4 oz. sinker. The casting device can thereby be adjusted according to the user and the weight to optimise the cast distance and force for either user. In the first instance the tension on the release mechanism would be set low so that arm 30 can move more freely and under less force in relation to mount 20. In the second instance where a strong adult casts a larger weight in an aggressive manner the tension adjustment on a release mechanism would be increased by rotating the adjusting dial to a higher tension level to clamp more tightly the arrangement of lever arm 30, washers 42, mount 20 and back plate 44 such that a greater force is required to rotate lever arm relative to mount 20.

While it is preferred that the casting device includes an adjusting mechanism to adjust the tension on the release mechanism, it is understood that a casting device may be made and sold having a single pre-tensioned release point that may be tailored to a particular end user.

One side of arm 30 has a foot 35 (illustrated in FIGS. 3(a), 3(b) and 4) which is adapted to rest against land 21 on mount 20 when lever arm 30 is in the standby position. Foot 35 provides a starting point, or a reference point, from which lever arm 30 will pivot and from which adjustment of release mechanism can be made relative to the reference point. The reference point can be defined by the re-set angle $\alpha$ between a straight line formed by the arm 30 and the straight base of flat land 21 of mount 20 (see FIG. 3(b).

In the first embodiment as illustrated in FIG. 4 land 21 includes a curved recess 49 to accommodate the rounded shoulder 33 of arm 30. Additionally, a friction strip (not shown) made of rubber or other suitable material, is fixed to the underside of land 21 to lie against the shaft of a fishing rod and prevent casting device 10 slipping along or off the fishing rod.

The casting device is typically lightweight and is made from a metal, plastics or graphite material so as to not add much weight to the fishing rod. For example, the mount, lever arm and pivot pin may all be made from moulded perspex. The washers are made from resilient material, such as silicon, Teflon® or rubber.

In use the casting device may be retrofitted onto a rod by, for example, taping the land 21 of mount 20 to the shaft 11 of the rod or otherwise fastening land 21 to the shaft. FIG. 1 illustrates the casting device 10 having tie slots 50 through which ties 51 may be threaded and the casting device tied to the rod. The device may be mounted anywhere along the rod but the most convenient position to mount the rod is between the reel and the first runner through which the fishing line extends.

Alternatively, the casting device may be sold permanently attached to a fishing rod or removably attached by sliding a front end of land 21 into a purpose built slot in the fishing rod.

The fishing casting device provides consistency in casting a fishing line and removes the human involvement of holding the fishing line with a digit before casting, which technique is prone to inaccuracy, uncoordination and premature or late release of the weighted line. The casting device reduces human error and facilitates casting a fishing line by all age groups and levels of experience.

It will be understood to persons skilled in the art of the invention that many modifications may be made without departing from the spirit and scope of the invention.

The claims defining the invention are as follows:

1. A fishing casting device for mounting onto a fishing rod, the casting device comprising:
   a mount and a lever arm pivotally connected to the mount, wherein a fishing line is releasably held at an end of the lever arm wherein a pivot pin connects the lever arm to the mount, and a release mechanism comprising a tension arrangement that applies tension at a pivot connection at the pivot pin between the lever arm and the mount so as to prevent the arm from pivoting relative to the mount during a casting action until a predetermined casting force is reached to thereby release the fishing line from the arm, wherein the release mechanism includes resilient washers on either side of the lever arm with one of the resilient washers located between the lever arm and the mount and the pivot pin is shifted axially to tighten or loosen the pivot connection by way of pressure applied by the resilient washers on the pivot pin, whereby the predetermined casting force is adjustable by increasing or decreasing the tension of the release mechanism.

2. The fishing casting device claimed in claim 1 wherein the resilient washers are made of silicon or rubber.

3. The fishing casting device claimed in claim 1 including an adjusting dial mounted at the pivot connection to adjust the tension of the release mechanism.

4. The fishing casting device claimed in claim 1 wherein the mount includes slots through which ties may be threaded for tying the casting device onto a fishing rod.

5. The fishing casting device claimed in claim 1, wherein the pivot connection can be tightened or loosened to increase or decrease the tension at the pivot connection.

6. The fishing casting device claimed in claim 1, the tension being directly proportional to the predetermined casting force.

* * * * *